(12) United States Patent
Chu et al.

(10) Patent No.: US 8,055,873 B2
(45) Date of Patent: Nov. 8, 2011

(54) DATA WRITING METHOD FOR FLASH MEMORY, AND CONTROLLER AND SYSTEM USING THE SAME

(75) Inventors: Chien-Hua Chu, Hsinchu County (TW); Chih-Kang Yeh, Kinmen County (TW); Jian-Yo Su, Taipei County (TW); Jui-Hsien Chang, Taipei County (TW)

(73) Assignee: Phison Electronics Corp., Miaoli (TW)

( * ) Notice: Subject to any disclaimer, the term of this patent is extended or adjusted under 35 U.S.C. 154(b) by 800 days.

(21) Appl. No.: 12/056,949

(22) Filed: Mar. 27, 2008

(65) Prior Publication Data
US 2009/0198875 A1 Aug. 6, 2009

(30) Foreign Application Priority Data
Feb. 5, 2008 (TW) .............................. 97104615 A

(51) Int. Cl.
*G06F 13/00* (2006.01)
(52) U.S. Cl. ......... 711/170; 711/103; 707/813; 707/824

(58) Field of Classification Search ........................ None
See application file for complete search history.

(56) References Cited

U.S. PATENT DOCUMENTS
5,841,699 A * 11/1998 Miyauchi ................. 365/185.33

FOREIGN PATENT DOCUMENTS
CN 1702776 11/2005
* cited by examiner

*Primary Examiner* — Hetul Patel
(74) *Attorney, Agent, or Firm* — J.C. Patents

(57) ABSTRACT

A data writing method for a flash memory is provided. The data writing method includes following steps. First, a block is selected as a substitute block from a spare area of the flash memory, wherein the substitute block is used for substituting a data block in a data area for writing a new data. Next, the new data is directly written into the substitute block starting from a start page, wherein there is valid data in the data block before the address for writing the new data. Thereby, meaningless data moving can be reduced, system performance can be improved, and overlong waiting time for writing the new data can be prevented.

16 Claims, 9 Drawing Sheets

(a)

(b)

DATA WRITING METHOD FOR FLASH MEMORY, AND CONTROLLER AND SYSTEM USING THE SAME

CROSS-REFERENCE TO RELATED APPLICATION

This application claims the priority benefit of Taiwan application serial no. 97104615, filed on Feb. 5, 2008. The entirety the above-mentioned patent application is hereby incorporated by reference herein and made a part of specification.

BACKGROUND

1. Technology Field

The present invention generally relates to a data writing method, in particular, to a data writing method for a flash memory and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides being applied in foregoing portable products, flash memory is also broadly applied to external products such as flash cards and flash disks. Thereby, flash memory has become one of the most focused electronic products in recent years.

A flash memory is usually divided into a plurality of physical blocks, and for the convenience of description, these physical blocks will be referred as blocks thereinafter. Each bit in a block of a flash memory can only be programmed from "1" to "0". Accordingly, an erasing operation has to be performed before writing data to a memory address which contains old data. Generally speaking, data in a flash memory is erased in unit of blocks. Namely, each block contains the smallest number of memory cells which are erased together. Each block is usually divided into a plurality of pages, and each page is the smallest programming unit, namely, each page is the smallest unit for writing or reading data. It should be noted that in some other different flash memory designs, the smallest programming unit may also be sector, namely, a page has a plurality of sectors and each sector is served as the smallest programming unit, such as in a single level cell (SLC) NAND flash memory having the number of program (NOP) as 4.

According to the conventional technique, when the programming unit is smaller than the erasing unit and a new data is to be written into a flash memory, a substitute block is first selected from the flash memory, the old valid data before an address at where the new data is to be written in the original block is written into the substitute block, and the new data is then written into the substitute block right after the old valid data.

However, moving the old data may become meaningless if a next writing command is to update the old data previously written into the substitute block, and accordingly the system performance may be reduced.

SUMMARY

Accordingly, the present invention is directed to a data writing method suitable for writing data into a flash memory, wherein meaningless data moving is reduced and accordingly the system performance is improved.

The present invention is directed to a flash memory controller which executes a data writing method, wherein meaningless data moving is reduced and accordingly the system performance is improved.

The present invention provides a data writing method suitable for a flash memory. In the data writing method, a block is selected as a substitute block from a spare area of the flash memory, wherein the substitute block is used for substituting a data block in a data area for writing a new data. Next, the new data is directly written into the substitute block starting from a start page, wherein there is valid data in the data block before the address for writing the new data.

According to an embodiment of the present invention, the data writing method further includes writing the valid data in the data block after the address for writing the new data into the substitute block following the new data.

According to an embodiment of the present invention, the data writing method further includes writing the valid data in the data block before the address for writing the new data into the substitute block following the valid data in the data block after the address for writing the new data.

According to an embodiment of the present invention, the data writing method further includes writing the valid data in the data block before the address for writing the new data into the substitute block following the new data.

According to an embodiment of the present invention, the data writing method farther includes recording the logical address corresponding to the new data recorded in the start page.

According to an embodiment of the present invention, the logical address is recorded in a logical-physical block mapping table.

The present invention provides a flash memory controller suitable for a storage apparatus having at least one flash memory. The flash memory controller includes a micro-processing unit, a flash memory interface, a buffer memory, and a memory management module. The flash memory interface is electrically connected to the micro-processing unit and is used for accessing the flash memory. The buffer memory is electrically connected to the micro-processing unit and is used for temporarily storing data. The memory management module is electrically connected to the micro-processing unit and is used for selecting a block as a substitute block from a spare area of the flash memory, wherein the substitute block is used for substituting a data block for writing a new data in a data area. And, the memory management module is used for directly writing the new data into the substitute block starting from a start page, wherein there is valid data in the data block before the address for writing the new data.

According to an embodiment of the present invention, the memory management module writes the valid data in the data block after the address for writing the new data into the substitute block following the new data.

According to an embodiment of the present invention, the memory management module writes the valid data in the data block before the address for writing the new data into the substitute block following the valid data in the data block after the address for writing the new data.

According to an embodiment of the present invention, the memory management module writes the valid data in the data block before the address for writing the new data into the substitute block following the new data.

According to an embodiment of the present invention, the flash memory is a single level cell (SLC) NAND flash memory or a multi level cell (MLC) NAND flash memory.

According to an embodiment of the present invention, the storage apparatus is a USB flash disk, a flash memory card, or a solid state drive (SSD).

According to an embodiment of the present invention, the memory management module records the logical address corresponding to the new data recorded in the start page.

According to an embodiment of the present invention, the memory management module records the logical address in a logical-physical block mapping table.

The present invention provides a flash memory storage device comprising a bus interface, a flash memory and a controller. A bus interface is used for connecting to a host. A flash memory is used for storing data. A controller is electrically connected to the bus interface and the flash memory for selecting a block as a substitute block which is for substituting a data block in a data area for writing a new data from a spare area of the flash memory, and directly writing the new data into the substitute block starting from a start page of the substitute block, wherein old data stored before the address for writing the new data in the data block is valid.

According to an embodiment of the present invention, the controller writes valid data in the data block after the address for writing the new data into the substitute block following the new data.

According to an embodiment of the present invention, the controller writes valid data in the data block before the address for writing the new data into the substitute block following the valid data in the data block after the address for writing the new data.

According to an embodiment of the present invention, the controller writes the valid data in the data block before the address for writing the new data into the substitute block following the new data.

According to an embodiment of the present invention, the flash memory is a single level cell (SLC) NAND flash memory or a multi level cell (MLC) NAND flash memory.

According to an embodiment of the present invention, the bus interface is a PCI express interface, a USB interface, an IEEE1394 interface, a SATA interface, a MS interface, a MMC interface, a SD interface, a CF interface or an IDE interface.

According to an embodiment of the present invention, the controller records a logical address corresponding to the new data recorded in the start page.

According to an embodiment of the present invention, the controller records the logical address in a logical-physical block mapping table.

In the present invention, a data writing method wherein a new data is directly written into a substitute block starting from a start page is provided such that the system performance can be improved and overlong writing interruption can be prevented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
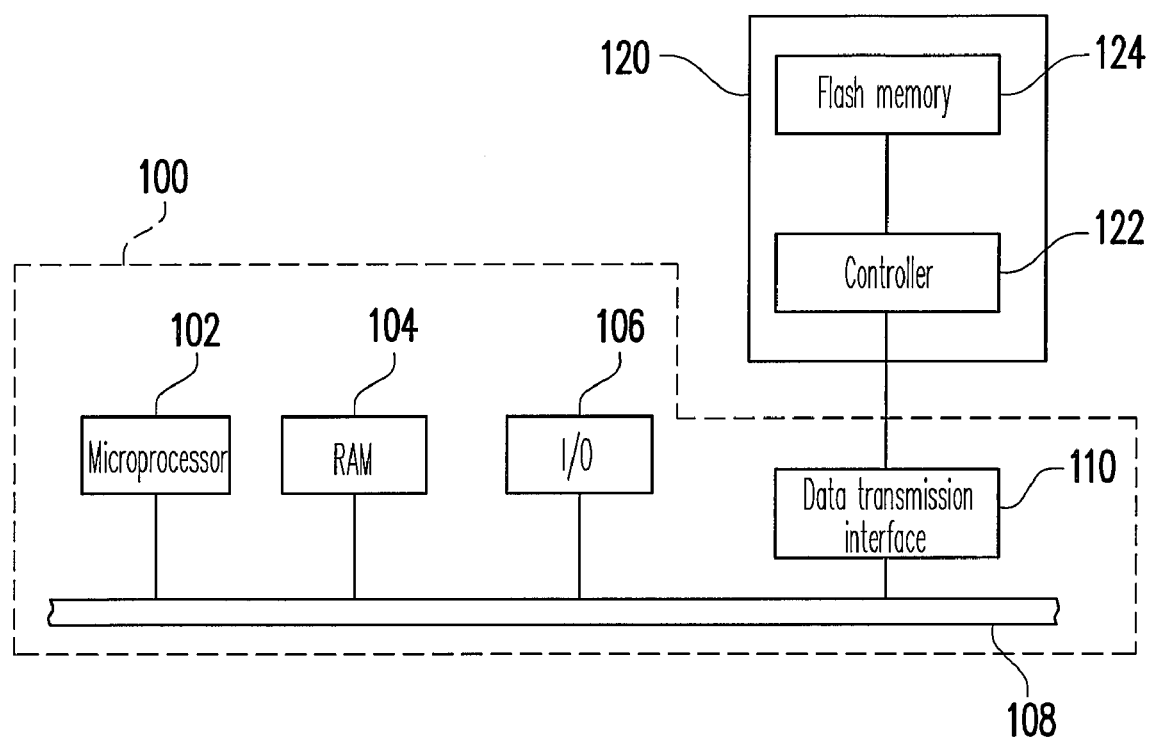
FIG. 1A illustrates a host using a flash memory storage apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

A flash memory storage system usually includes a flash memory and a controller (control IC). A flash memory storage system is usually used along with a host system so that the host system can write data into the flash memory storage system or read data from the flash memory storage system. Additionally, a flash memory storage system may also include an embedded flash memory and a software which is executed in the host system and served substantially as a controller of the embedded flash memory.

FIG. 1A illustrates a host using a flash memory storage apparatus according to an embodiment of the present invention.

Referring to FIG. 1A, the host 100 includes a microprocessor 102, a random access memory (RAM) 104, an input/output (I/O) device 106, a system bus 108, and a data transmission interface 110. It should be understood that the host 100 may further include other components, such as a display device or a network device.

The host 100 may be a computer, a digital camera, a video camera, a communication device, an audio player, or a video player. Generally speaking, the host 100 can be substantially any system which can store data.

In the present embodiment, the flash memory storage apparatus 120 is electrically connected to the other components of the host 100 through the data transmission interface 110. Data can be written into or read from the flash memory storage apparatus 120 through the processing of the microprocessor 102, the RAM 104, and the I/O device 106. The flash memory storage apparatus 120 may be a flash disk, a flash memory card, or a solid state drive (SSD).

Figure 1B:
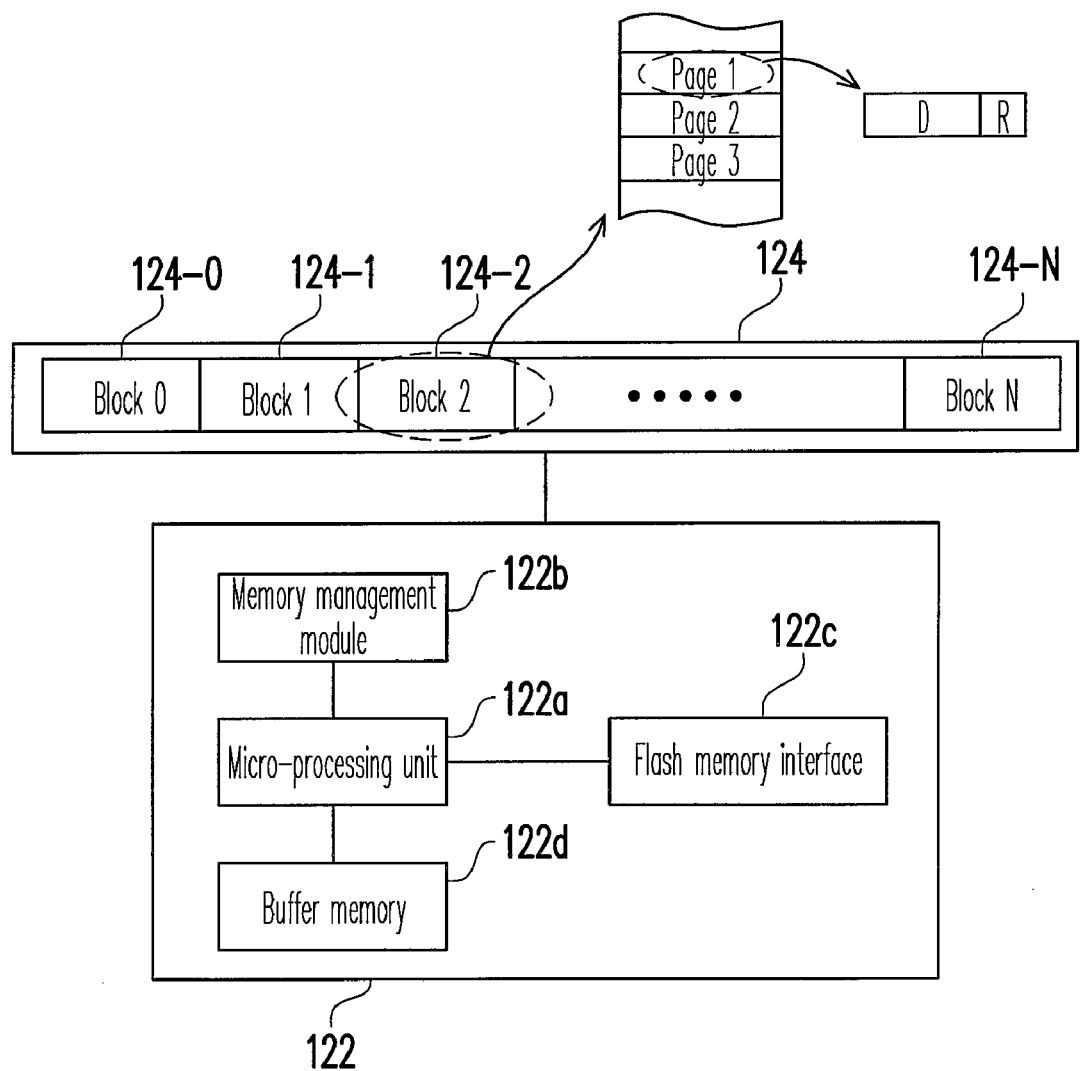
FIG. 1B is a detailed block diagram of the flash memory storage apparatus in FIG. 1A.

FIG. 1B is a detailed block diagram of the flash memory storage apparatus in FIG. 1A.

Referring to FIG. 1B, the flash memory storage apparatus 120 includes a controller 122 and a flash memory 124.

The controller 122 is used for controlling the operations performed to the flash memory 124, such as the storing, reading, and erasing of data. The controller 122 includes a micro-processing unit 122a, a memory management module 122b, a flash memory interface 122c, and a buffer memory 122d.

The micro-processing unit 122a coordinates the operation all components in the controller 122.

Figure 4:
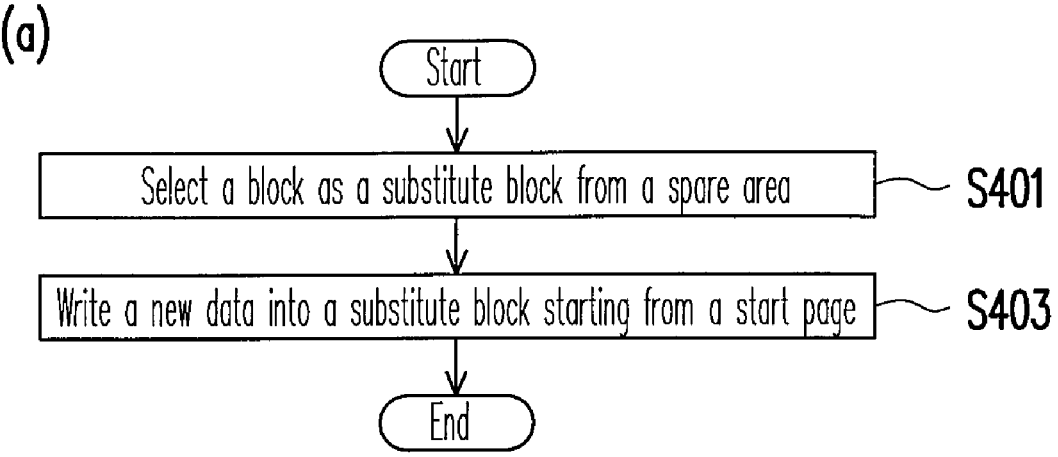
FIG. 4 is a flowchart illustrating a data writing method for a flash memory according to an embodiment of the present invention.
Figure 4:
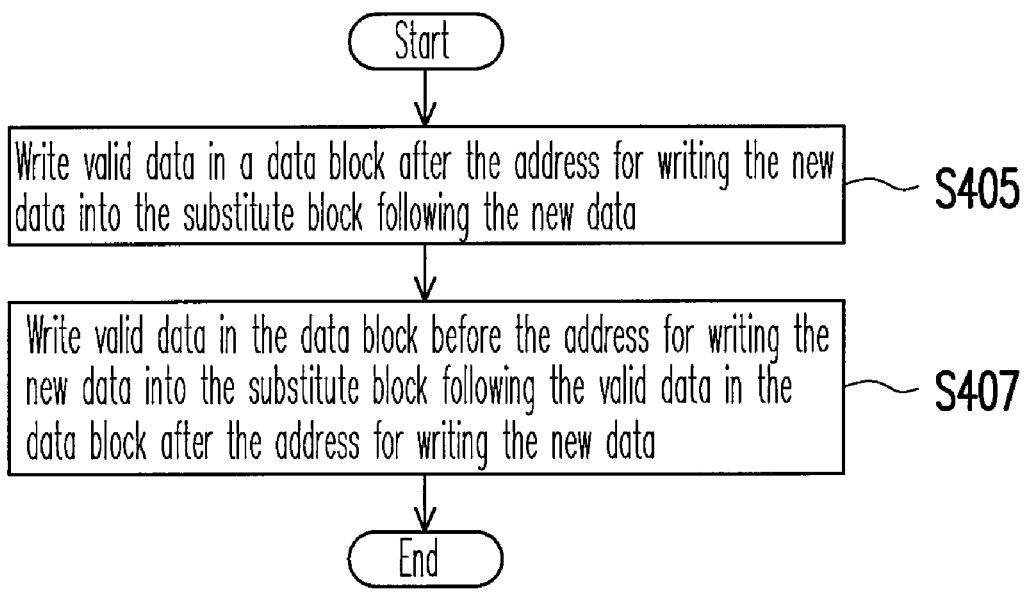

The memory management module 122b is electrically connected to the micro-processing unit 122a. The memory management module 122b manages the flash memory 124, for example, executes a wear leveling method, manages bad blocks, or maintains a mapping table etc. Particularly, in the present embodiment, the memory management module 122*b* executes data writing steps (as illustrated in FIG. 4) provided by the present invention, and the memory management module 122*b* may be a firmware or a hardware for executing the data writing steps.

The flash memory interface 122*c* is electrically connected to the micro-processing unit 122*a* and is used for accessing the flash memory 124. In other words, the data to be written into the flash memory 124 by the host 100 is first converted by the flash memory interface 122*c* into a format acceptable to the flash memory 124.

The buffer memory 122*d* is used for temporarily storing system data (for example, a mapping table) or the data to be read or written by the host 100. In the present embodiment, the buffer memory 122*d* is a static random access memory (SRAM). However, the present invention is not limited thereto, and a dynamic random access memory (DRAM), a magnetoresistive random access memory (MRAM), a phase-change random access memory (PRAM), or other suitable memories may also be applied in the present invention.

Figure 1C:
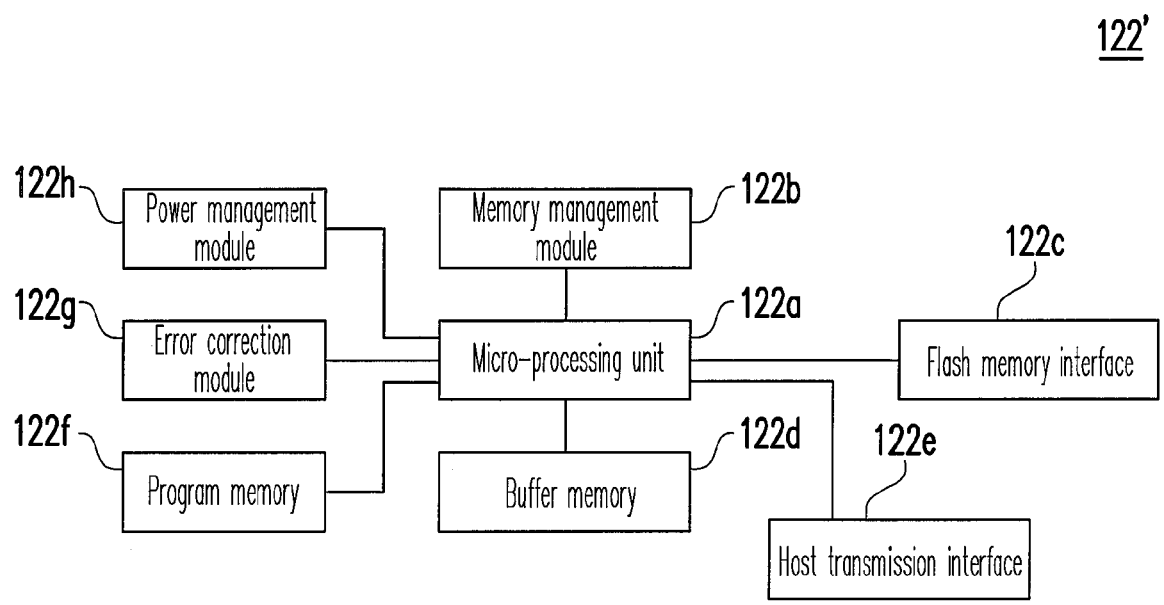
FIG. 1C is a block diagram of a controller according to another embodiment of the present invention.

In another embodiment of the present invention, the controller further includes a host transmission interface 122*e*, a program memory 122*f*, an error correction module 122*g*, and a power management module 122*h* (as the controller 122' illustrated in FIG. 1C).

The host transmission interface 122*e* is electrically connected to the micro-processing unit 122*a* and is used for communicating with the host 100. The host transmission interface 122*e* may be a USB interface, an IEEE 1394 interface, a SATA interface, a PCI Express interface, a MS interface, a MMC interface, a SD card interface, a CF card interface, or an IDE interface.

The program memory 122*f* is electrically connected to the micro-processing unit 122*a* and is used for storing a program code which is executed by the controller for controlling the flash memory storage apparatus 120.

The error correction module 122*g* is electrically connected to the micro-processing unit 122*a* and is used for calculating an error correcting code which is used for checking and correcting the data to be read or written by the host.

The power management module 122*h* is electrically connected to the micro-processing unit 122*a* and is used for managing the power supply of the flash memory storage apparatus 120.

The flash memory 124 is used for storing data. In the present embodiment, the flash memory 124 is a multi level cell (MLC) NAND flash memory. However, the present invention is not limited thereto, and the flash memory 124 may also be a single level cell (SLC) NAND flash memory.

The flash memory 124 is substantially divided into a plurality of physical blocks 124-0~124-N, and for the convenience of description, these physical blocks will be referred as blocks thereinafter. Generally speaking, data in a flash memory is erased in unit of blocks. Namely, each block contains the smallest number of memory cells which are erased together. A block is usually divided into a plurality of pages, and each page is served as the smallest programming unit. However, it should be noted that in some other different flash memory designs, the smallest programming unit may also be sector, namely, each page contains a plurality of sectors and each sector is served as the smallest programming unit. In other words, page is the smallest unit for writing and reading data. A page usually includes a user data area D and a redundant area R. The user data area D is used for storing user data, and the redundant area is used for storing system data (for example, the ECC code).

Generally, the user data area D has 512 bytes and the redundant area R has 16 bytes in order to correspond to the size of sectors in a disk drive. In other words, a page is a sector. However, a page may also be composed of a plurality of sectors. For example, a page may include four sectors.

Generally, a block may be composed of any number of pages, such as 64 pages, 128 pages, and 256 pages etc. The blocks 124-0~124-N are usually grouped into a plurality of zones. By managing operations of a flash memory based on zones, parallelism of the operations can be increased and the management can be simplified.

Below, the operations performed to a flash memory according to the present invention will be described in detail with reference to accompanying drawings. It should be understood that the terms "select", "move", and "substitute" used in following description only refer to logical operations performed to a flash memory. In other words, the physical positions of blocks in the flash memory are not changed; instead, these blocks in the flash memory are only operated logically.

Figure 2A:
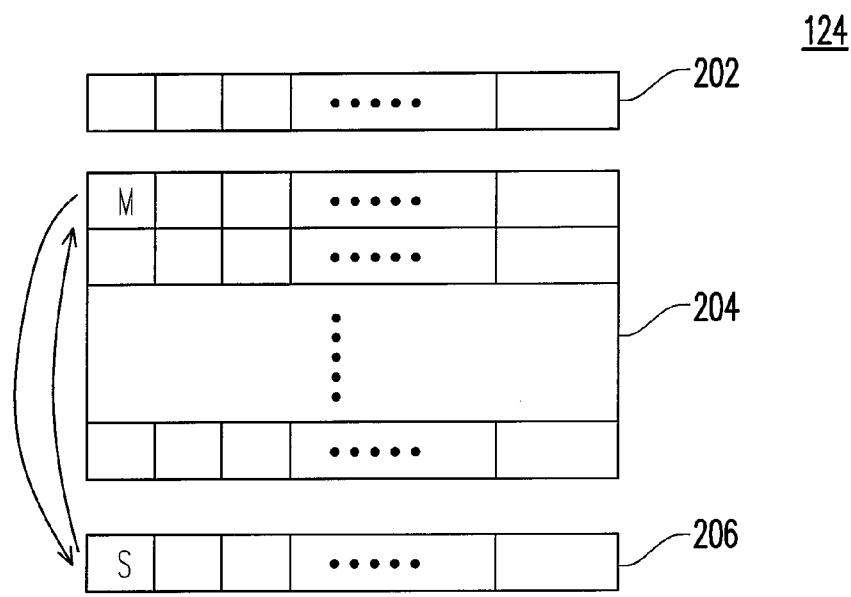
FIG. 2A and FIG. 2B are block diagrams illustrating a flash memory and the operation thereof according to an embodiment of the present invention.
Figure 2B:
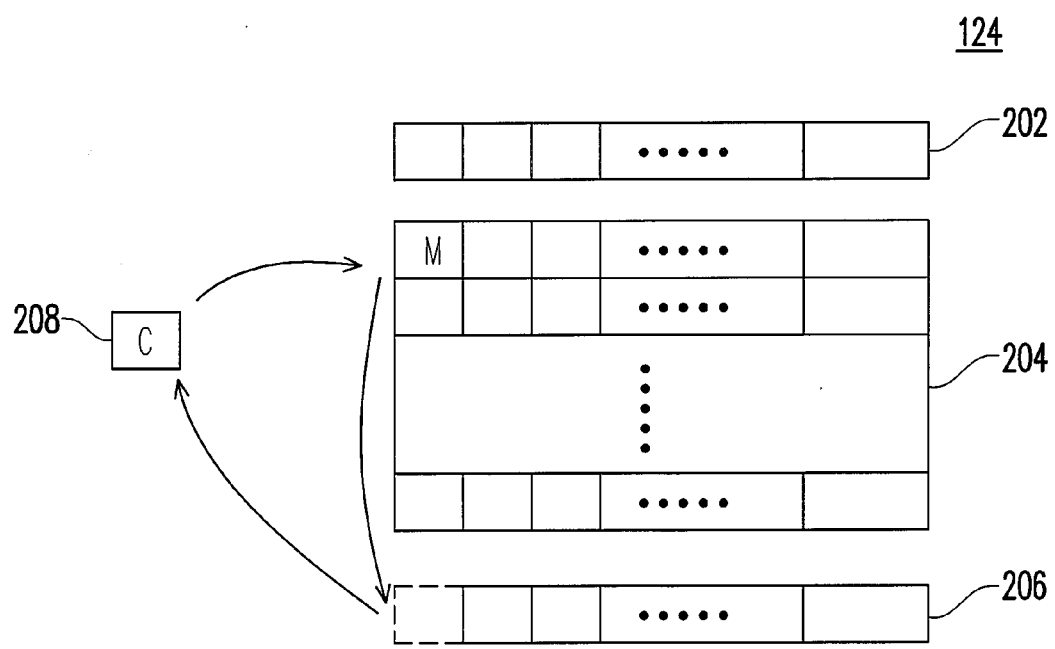

FIG. 2A and FIG. 2B are block diagrams illustrating the flash memory 124 and the operation thereof according to an embodiment of the present invention.

Referring to FIG. 2A, in the present embodiment, in order to program (i.e. write and erase) the flash memory 124 efficiently, the blocks 124-1~124-N in the flash memory 124 are logically grouped into a system area 202, a data area 204, and a spare area 206. Generally speaking, more than 90% of the blocks in the flash memory 124 belong to the data area 204.

Blocks in the system area 202 are used for recording system data, such as the number of zones in the flash memory 124, the number of blocks in each zone, the number of pages in each block, and a logical-physical mapping table etc.

Blocks in the data area 204 are used for storing user data, and these blocks are usually the blocks corresponding to the logical block addresses operated by the host 100.

Blocks in the spare area 206 are used for substituting the blocks in the data area 204. Accordingly, blocks in the spare area 206 are empty or available blocks, namely, no data is recorded in these blocks or data recorded in these blocks has been marked as invalid data. To be specific, an erasing operation has to be performed before writing data to an address in which data has been recorded. However, as described above, data is written into a flash memory in unit of pages while erased from the same in unit of blocks. Since the erase unit is larger than the write unit, before erasing data from a block, those valid pages in the block have to be copied to another block. Accordingly, to write a new data into a block M in the data area 204 in which a data has been recorded, a block S is first selected from the spare area 206, and the valid data in the block M is copied to the block S and the new data is also written into the block S. After that, the block M is erased and moved to the spare area 206, and at the same time, the block S is moved to the data area 204. It has to be understood that moving the block M to the spare area 206 and moving the block S to the data area 204 refers to that the block M is logically linked to the spare area 206 and the block S is logically linked to the data area 204. It should be understood by those having ordinary knowledge in the art that the logical relationship between the blocks in the data area 204 can be maintained through a logical-physical mapping table.

In the present embodiment, the blocks 124-1~124-N are further logically grouped into a substitute block 208 in order to use the flash memory 124 more efficiently.

Figure 2C:
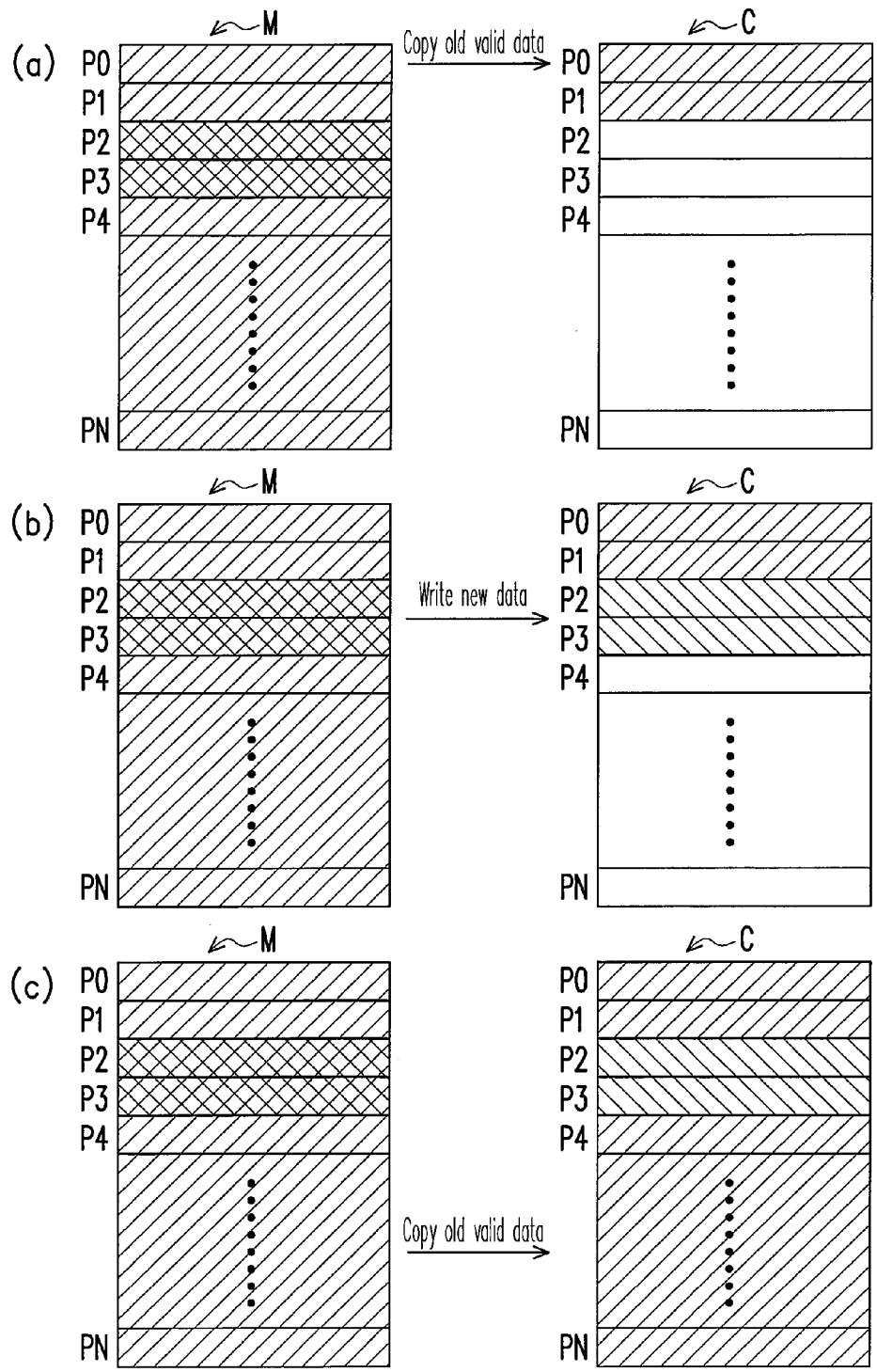
FIG. 2C illustrates the detailed operation of the flash memory as illustrated in FIG. 2B.

FIG. 2B illustrates another operation performed to a flash memory, and FIG. 2C illustrates the detailed operation of the flash memory as illustrated in FIG. 2B.

Referring to FIG. 2B, the substitute block 208 is a temporary block used for substituting the blocks in the data area 204. To be specific, in the present embodiment, when a block C in the spare area 206 is selected for substituting the block M in the data area 204, the new data is written into the block C, but the valid data in the block M is not moved to the block C instantly to erase the block M.

To be specific, valid data (i.e. pages P0 and P1) in the block M before the address for writing the new data is copied into the block C (as shown in FIG. 2C (a)), and the new data (i.e. pages P2 and P3 in the block C) is written into the block C (as shown in FIG. 2C (b)). Here, the block C containing part of the old valid data and the new data is temporarily linked as the substitute block 208. This is because the valid data in the block M may become invalid in the next operation, and accordingly instantly moving all the valid data in the block M to the physical block C may become meaningless. In the present example, the fact that a plurality of physical block addresses are mapped to one logical block address is recorded in a logical-physical block mapping table, namely, the combination of the contents in the block M and the block C is the content of the corresponding logical block. Such a mother-child block (block M and block C) relationship can be determined according to the size of the buffer memory 122d in the controller 122, and in the present embodiment, five mappings are described as an example.

Thereafter, the block M and the block C are only integrated into one block when the contents in the block M and the block C are to be actually combined, so that the efficiency in using the blocks can be improved. For example, as shown in FIG. 2C (c), to integrate the blocks, the remaining valid data in the block M (i.e. pages P4~PN) is coped into the block C, and the block M is then erased and linked to the spare area 206. Meanwhile, the block C is linked to the data area 204. By now the integration of these blocks is completed.

It should be mentioned that in the data writing method illustrated in FIG. 2C, the programming specification of the flash memory requests that data has to be written in each block from the first page to the last page and each bit can be programmed only once (i.e. can only be programmed from "1" to "0"). Accordingly, once data is written into a page, a blank block has to be selected (as shown in FIG. 2B) and the steps in FIG. 2C have to be repeated in order to update the data written into this page. Thereby, when the integration operation as illustrated in FIG. 2C (c) is not yet performed to the blocks (i.e. the blocks are in the temporary state shown in FIG. 2C(b)) and the newly moved data has to be updated (for example, pages P0~P1 in FIG. 2C), namely, a random writing mode is entered, the moved old data has to be moved again.

For example, a file allocation table (FAT) is usually used in a storage apparatus for managing the storage media, wherein the FAT data is accessed frequently. Accordingly, the random writing mode may be entered if the newly moved data is constantly updated when the FAT table is accessed. In the random writing mode, the operation illustrated in FIG. 2B and FIG. 2C may be executed repeatedly so that the memory management module 122b has to move data every time data is written into the storage apparatus. As a result, the performance of the flash memory storage apparatus 120 is reduced.

Figure 3A:
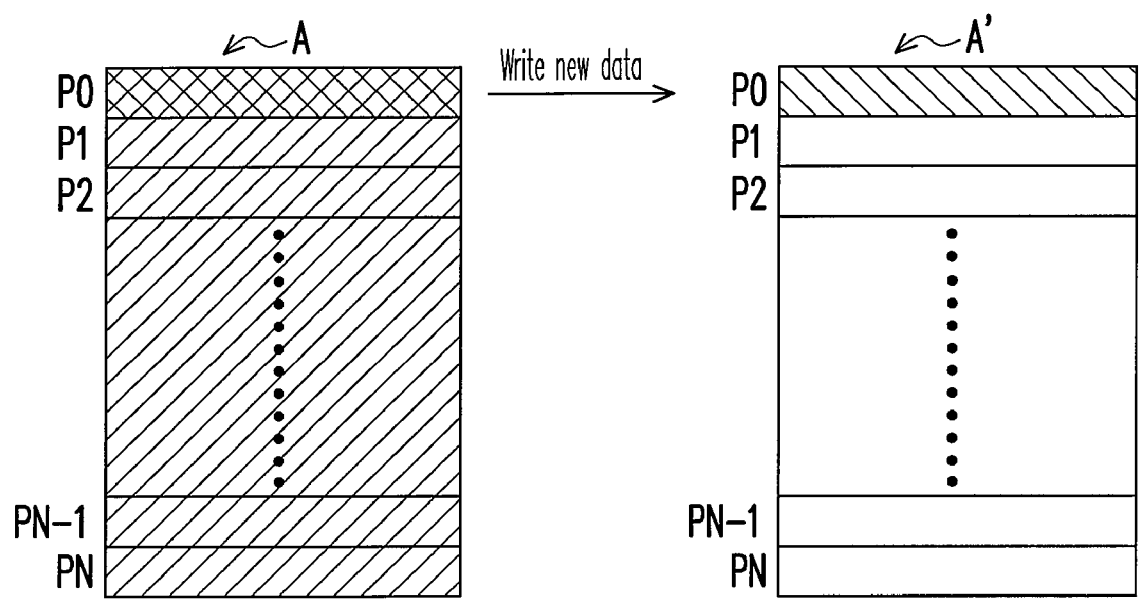
FIG. 3A and FIG. 3B illustrate a data writing operation according to another embodiment of the present invention.
Figure 3B:
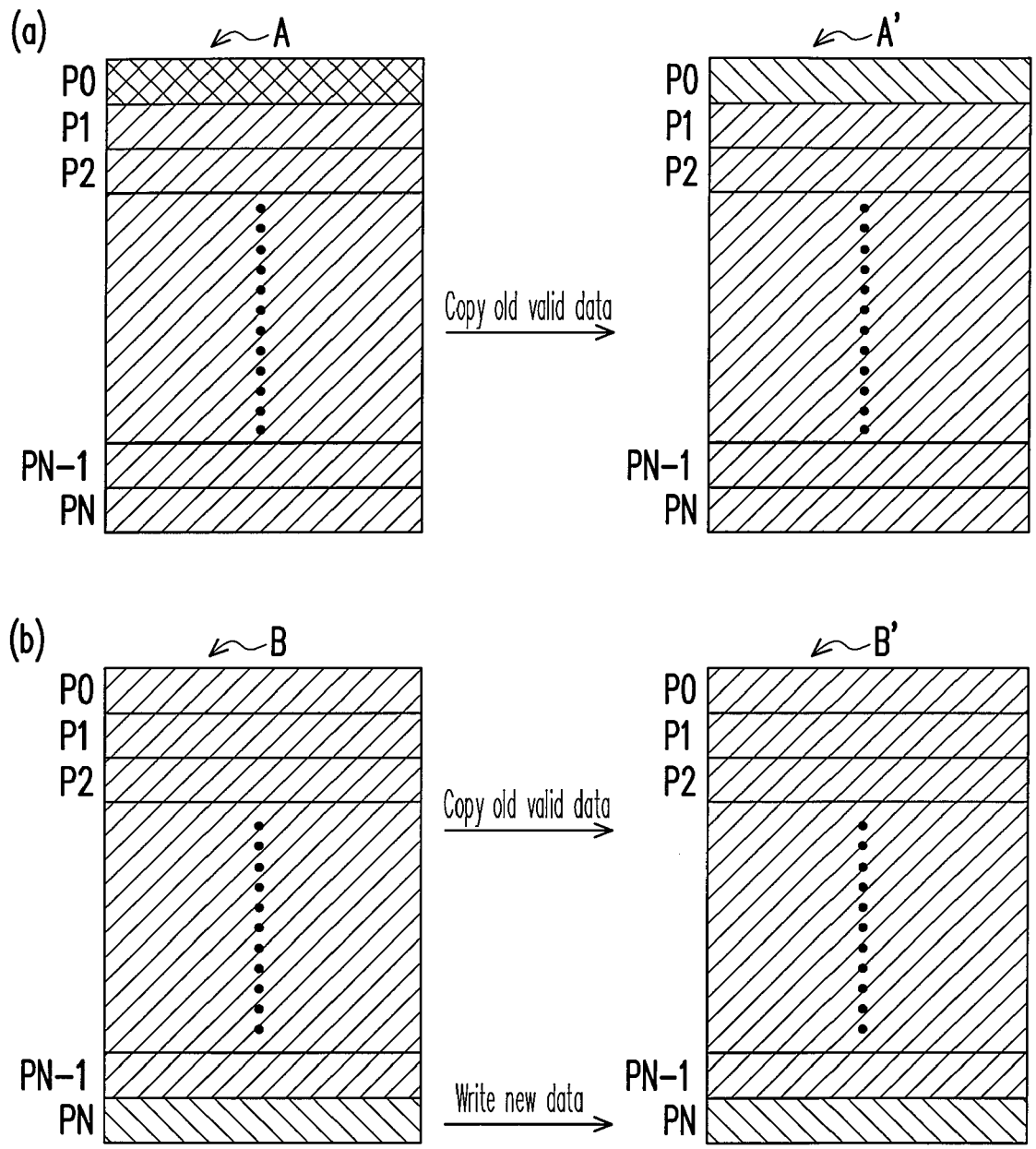

Additionally, it is assumed that a previous writing command is to write data into a start page of a block A and the buffer memory 122d records that the block A and a substitute block A' thereof are in foregoing temporary state (as illustrated in FIG. 3A), namely, the new data has been written into a page P0 of the substitute block A' and the remaining valid data in the block A is not yet written into the substitute block A'. Here if the current writing command is to write data into the last page of a block B, and the block A and the substitute block A' thereof have to be combined due to the limitation in the capacity of the buffer memory 122d, as shown in FIG. 3B, the memory management module 122b has to move the valid data in the block A (i.e. data in pages PL~PN of the block A) to the substitute block A' to complete the combination first, and then moves the valid data in the block B (i.e. data in the pages P0~PN−1 of the B) to the pages P0~PN−1 of a substitute block B', and after that, the memory management module 122b writes the new data into the page PN of the substitute block B'. However, in many system applications (for example, in a digital video camera), such overlong interruption during a data writing operation is not allowed, and accordingly, system failure may be caused if foregoing mother-child block management mechanism is adopted.

Accordingly, in the present embodiment, a data writing method for a flash memory is further executed so as to prevent the system from entering the random writing mode. Accordingly, the reduction in system performance and system failure due to overlong interruption can be both prevented.

Figure 5:
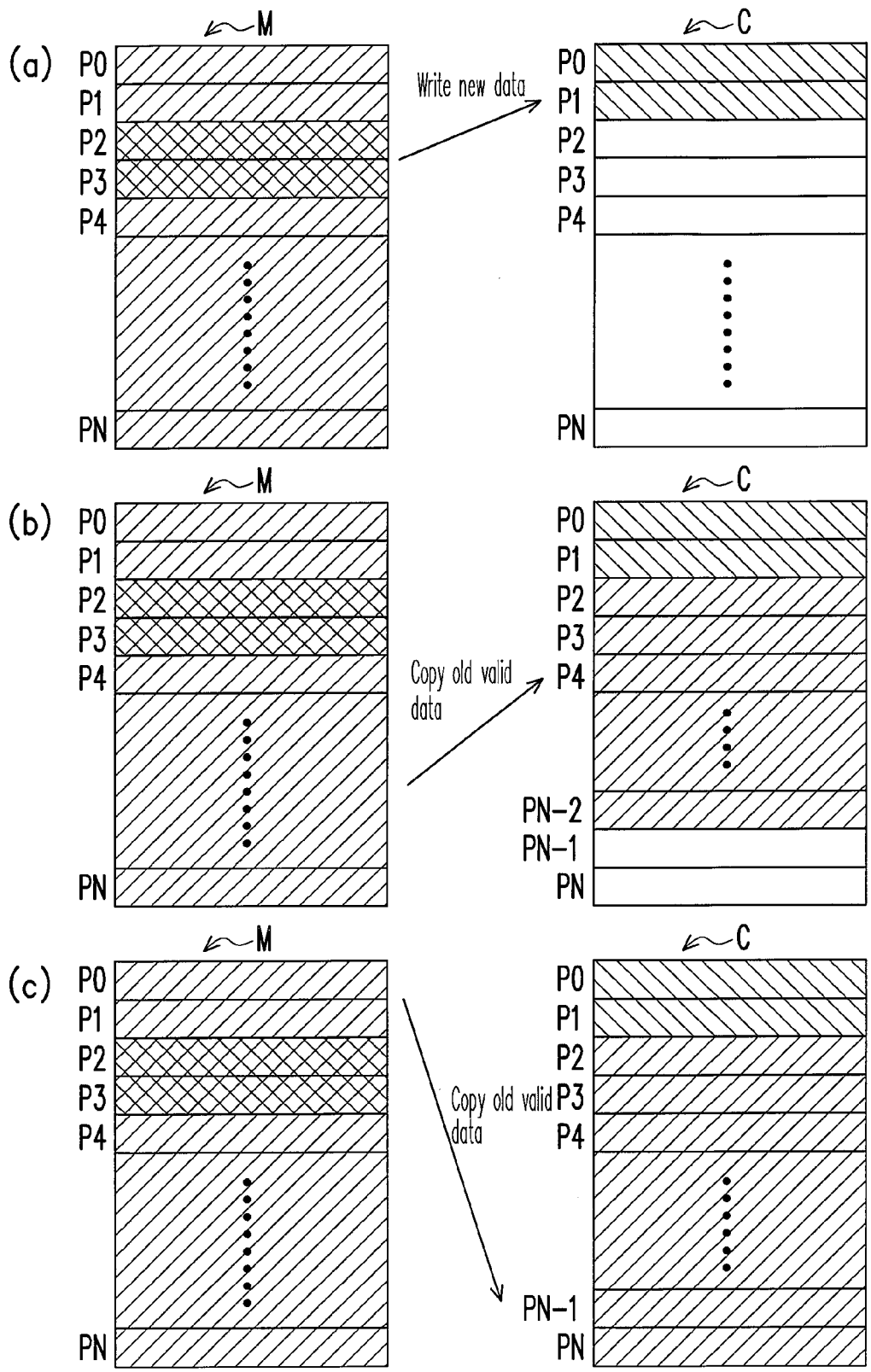
FIG. 5 illustrates a data writing operation according to the data writing method for a flash memory illustrated in FIG. 4.

FIG. 4 is a flowchart illustrating a data writing method for a flash memory according to an embodiment of the present invention implemented by the memory management module 122b, and FIG. 5 illustrates a data writing operation performed to the flash memory according to the data writing method for a flash memory illustrated in FIG. 4.

Referring to FIG. 4 and FIG. 5, in step 401, to write a new data into the flash memory, a block C is first selected as a substitute block 208 from the spare area 206 of the flash memory 124. As described above, the block C is used for substituting a block M in the data area 204 for writing the new data. Next, in step 403, the new data is writing into the substitute block 208 starting from a start page of the substitute block 208. In other words, in the present embodiment, the valid old data in the block M before the address for writing the new data (i.e. data in pages P0~P1 of the block M) is not instantly copied to the block C. In step S403, the new data is directly written into the pages P0~P1 of the block C. Here, the flash memory management module 120b remains in the temporary state. As described above, in the present embodiment, the flash memory management module 120b records five sets of such temporary relationships (between the block M and the block C).

As described above, when the host 100 writes data into the flash memory storage apparatus 120, the flash memory storage apparatus 120 does not move the old data instantly, so that meaningless moving of the old data if the next writing command is to update the moved data can be avoided. In addition, when the host 100 issues a writing command to the flash memory storage apparatus 120, the flash memory storage apparatus 120 can execute the writing command in a short time and responds the host 100 before it goes on to integrate other mother-child blocks, so that system failure caused by overlong interruption can be avoided.

In another embodiment of the present invention, if the mother-child blocks have to be integrated, then as shown in FIG. 4(b), in step S405, the valid data in the data block after the address for writing the new data is written into the substitute block following the new data, and in step S407, the valid data in the data block before the address for writing the new data is written into the substitute block following the valid data in the data block after the address for writing the new data. For example, while combining the block M and the block C, data in the pages P4~PN of the block M is coped to the pages P2~PN−2 of the block C (as shown in FIG. 5(b)). Finally, data in the pages P0~P1 of the block M is coped to the pages PN−1~PN of the block C (as shown in FIG. 5(c)).

In another embodiment of the present invention, if there is no more valid data in the data block after the address for writing the new data, then during the combination, only the valid data in the data block before the address for writing the new data is written into the substitute block following the new data.

Generally speaking, while writing data into a flash memory, for the convenience of management, logical block addresses are directly mapped to physical block addresses. For example, the page P0 in a logical block is mapped to the page P0 in a physical block, the page P1 in a logical block is mapped to the page P1 in a physical block, and the page PN in a logical block is mapped to the page PN in a physical block. However, foregoing mappings will be broken after executing the data writing method in the present embodiment. For example, as shown in FIG. 5(c), the pages P0~PL in a logical block are mapped to the pages PN−1~PN in a physical block, the pages P2~P3 in a logical block are mapped to the pages P0~P1 in a physical block, and the pages P4~PN in a logical block are mapped to the pages P2~PN−2 in a physical block.

The data writing method in the present embodiment may further include recording a logical address corresponding to the new data recorded in the start page of the block. To be specific, since the number of pages in each block in the flash memory has been specified when the flash memory is manufactured, the pages in the logical block corresponding to the pages in the physical block can be determined according to the repetition of pages. For example, assuming each block has 128 pages, if the start page of a physical block is corresponding to the page 60 of a logical block, the pages after the start page are respectively corresponding to the pages 61~127 and the pages 0~59 of the logical block.

In another embodiment of the present invention, the logical address of the start page is recorded in a logical-physical block mapping table. In other words, this information is recorded into the logical-physical block mapping table together with the original logical-physical block mapping information of the flash memory storage apparatus, so that no additional block management work is produced. However, the present invention is not limited thereto, and other recording methods may also be applied in the present invention without departing the scope and spirit of the present invention.

In overview, according to the present invention, a new data is directly written into a start page of a substitute block so that when the flash memory storage apparatus enters a random writing mode, meaningless moving of data can be reduced and accordingly the performance of the flash memory storage apparatus can be improved. Moreover, by directly writing the new data into the substitute block to respond to the writing command of the system and then executing the integration of the blocks at the backend, system failure caused by overlong writing interruption can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a flash memory, the data writing method comprising:
    selecting a block as a substitute block from a spare area of the flash memory, wherein the substitute block is used for substituting a data block of a data area for writing a new data, the data block and the substitute block respectively has a plurality of pages which are arranged orderly and the new data is about to be written into at least one first page among the pages of the data block;
    directly writing the new data into at least one first page among the pages of the substitute block, wherein the at least one first page of the substitute block starts from a start page among the pages of the substitute block, wherein at least one second page among the pages of the data block arranged before the at least one first page of the data block that the new data to be written into stores first valid data; and
    copying second valid data into at least one third page among the pages of the substitute block from at least one third page among the pages of the data block, wherein the at least one third page of the data block follows the at least one first page of the data block and the at least one third page of the substitute block follows the at least one first page of the substitute block.

2. The data writing method according to claim 1, further comprising copying the first valid data into at least one second page among the pages of the substitute block, wherein the at least one second page of the substitute block follows the at least one third page of the substitute block.

3. The data writing method according to claim 1, further comprising recording a logical address corresponding to the new data recorded in the start page.

4. The data writing method according to claim 3, wherein the logical address is recorded in a logical-physical block mapping table.

5. A flash memory controller for a storage apparatus having at least one flash memory, the flash memory controller comprising:
    a micro-processing unit;
    a flash memory interface, electrically connected to the micro-processing unit for accessing the flash memory;
    a buffer memory, electrically connected to the micro-processing unit for temporarily storing data; and
    a memory management module, electrically connected to the micro-processing unit for selecting a block from a spare area of the at least one flash memory as a substitute block, wherein the substitute block is used for substituting a data block of a data area for writing a new data, the data block and the substitute block respectively has a plurality of pages which are arranged orderly and the new data is about to be written into at least one first page among the pages of the data block,
    wherein the memory management module directly writes the new data into at least one first page among the pages of the substitute block, wherein the at least one first page of the substitute block starts from a start page among the pages of the substitute block, wherein at least one second page among the pages of the data block before the at least one first page of the data block that the new data to be written into stores first valid data,
    wherein the memory management module copies second valid data into at least one third page among the pages of the substitute block from at least one third page among the pages of the data block, wherein the at least one third page of the data block follows the at least one first page of the data block and the at least one third page of the substitute block follows the at least one first page of the substitute block.

6. The flash memory controller according to claim 5, wherein the memory management module copies the first valid data into at least one second page among the pages of the substitute block, wherein the at least one second page of the substitute block follows the at least one third page of the substitute block.

7. The flash memory controller according to claim 5, wherein the flash memory is a single level cell (SLC) NAND flash memory or a multi level cell (MLC) NAND flash memory.

8. The flash memory controller according to claim 5, wherein the storage apparatus is a USB flash disk, a flash memory card, or a solid state drive (SSD).

9. The flash memory controller according to claim 5, wherein the memory management module records a logical address corresponding to the new data recorded in the start page.

10. The flash memory controller according to claim 9, wherein the memory management module records the logical address in a logical-physical block mapping table.

11. A flash memory storage device, comprising:
a bus interface, configured to couple to a host;
a flash memory, configured to store data; and
a controller, electrically connected to the bus interface and the flash memory for selecting a block from a spare area of the flash memory as a substitute block, wherein the substitute block is used for substituting a data block of a data area for writing a new data, the data block and the substitute block respectively has a plurality of pages which are arranged orderly and the new data is about to be written into at least one first page among the pages of the data block,
wherein the controller directly writes the new data into at least one first page among the pages of the substitute block, wherein the at least one first page of the substitute block starts from a start page among the pages of the substitute block, wherein at least one second page among the pages of the data block before the at least one first page of the data block that the new data to be written into stores first valid data,
wherein the controller copies second valid data into at least one third page among the pages of the substitute block from at least one third page among the pages of the data block, wherein the at least one third page of the data block follows the at least one first page of the data block and the at least one third page of the substitute block follows the at least one first page of the substitute block.

12. The flash memory storage device according to claim 11, wherein the controller copies the first valid data into at least one second page among the pages of the substitute block, wherein the at least one second page of the substitute block follows the at least one third page of the substitute block.

13. The flash memory storage device according to claim 11, wherein the flash memory is a single level cell (SLC) NAND flash memory or a multi level cell (MLC) NAND flash memory.

14. The flash memory storage device according to claim 11, wherein the bus interface is a PCI express interface, a USB interface, an IEEE1394 interface, a SATA interface, a MS interface, a MMC interface, a SD interface, a CF interface or an IDE interface.

15. The flash memory storage device according to claim 11, wherein the controller records a logical address corresponding to the new data recorded in the start page.

16. The flash memory storage device according to claim 15, wherein the controller records the logical address in a logical-physical block mapping table.

* * * * *